United States Patent
Heise et al.

(10) Patent No.: US 10,214,189 B2
(45) Date of Patent: Feb. 26, 2019

(54) INTERFACE FOR INTERCHANGING DATA BETWEEN REDUNDANT PROGRAMS FOR CONTROLLING A MOTOR VEHICLE

(71) Applicant: Continental Teves AG & Co. OHG, Frankfurt (DE)

(72) Inventors: Andreas Heise, Erzhausen (DE); Kai Schade, Münster (DE); Marco Sänger, Rodgau (DE); Reinhard Herr, Kelkheim (DE); Michael Zydek, Frankfurt (DE); Ralf Hartman, Kriftel (DE); Houman Amjadi, Karlsruhe (DE)

(73) Assignee: CONTINENTAL TEVES AG & CO. OHG, Frankfurt (DE)

( * ) Notice: Subject to any disclaimer, the term of this patent is extended or adjusted under 35 U.S.C. 154(b) by 0 days.

(21) Appl. No.: 14/435,833

(22) PCT Filed: Oct. 16, 2013

(86) PCT No.: PCT/EP2013/071615
§ 371 (c)(1),
(2) Date: Apr. 15, 2015

(87) PCT Pub. No.: WO2014/060470
PCT Pub. Date: Apr. 24, 2014

(65) Prior Publication Data
US 2016/0046265 A1    Feb. 18, 2016

(30) Foreign Application Priority Data
Oct. 16, 2012  (DE) .................. 10 2012 218 852

(51) Int. Cl.
*G05D 1/00*     (2006.01)
*B60T 7/12*     (2006.01)
(Continued)

(52) U.S. Cl.
CPC ............. *B60T 7/12* (2013.01); *G05B 15/02* (2013.01); *G05D 1/0055* (2013.01); *G06F 9/544* (2013.01);
(Continued)

(58) Field of Classification Search
None
See application file for complete search history.

(56) References Cited

U.S. PATENT DOCUMENTS

| | | | |
|---|---|---|---|
| 2004/0026158 A1* | 2/2004 | Rieth | B62D 5/003 180/402 |
| 2006/0218432 A1* | 9/2006 | Traskov | G06F 11/1016 714/5.11 |

(Continued)

FOREIGN PATENT DOCUMENTS

| | | |
|---|---|---|
| CN | 102622470 A | 8/2012 |
| DE | 112008001528 T5 | 4/2010 |

(Continued)

OTHER PUBLICATIONS

PCT International Search Report and Written Opinion dated Jan. 3, 2014.

*Primary Examiner* — Truc M Do
(74) *Attorney, Agent, or Firm* — Brinks Gilson & Lione

(57) ABSTRACT

An electronic control unit for controlling and/or regulating at least one motor vehicle includes at least one integrated microcontroller system for executing software and at least two microcontroller units that each executes at least one independent operating system. The at least one interface is provided for the purpose of interchanging information between the microcontroller units. The electronic control unit includes a first microcontroller unit configured to control and/or regulate of a first motor vehicle system, and a second microcontroller unit configured to use the interface (Continued)

of the first microcontroller unit to provide defaults for the control and/or regulation of the first motor vehicle system.

14 Claims, 3 Drawing Sheets

(51) Int. Cl.
   *G06F 9/54* (2006.01)
   *G06F 11/16* (2006.01)
   *G05B 15/02* (2006.01)
(52) U.S. Cl.
   CPC .... *G06F 11/1629* (2013.01); *G06F 2201/845* (2013.01)

(56) References Cited

U.S. PATENT DOCUMENTS

| | | | | |
|---|---|---|---|---|
| 2008/0194273 | A1* | 8/2008 | Kansal | G01C 21/20 |
| | | | | 455/456.3 |
| 2011/0022246 | A1* | 1/2011 | Rieth | G08G 1/0969 |
| | | | | 701/1 |
| 2011/0054716 | A1* | 3/2011 | Stahlin | G01C 21/28 |
| | | | | 701/1 |

FOREIGN PATENT DOCUMENTS

| | | |
|---|---|---|
| DE | 102011005800 A1 | 9/2011 |
| DE | 102011007467 A1 | 11/2011 |
| EP | 1456720 B1 | 11/2007 |
| WO | WO03050624 A1 | 6/2003 |

* cited by examiner

INTERFACE FOR INTERCHANGING DATA BETWEEN REDUNDANT PROGRAMS FOR CONTROLLING A MOTOR VEHICLE

CROSS REFERENCE TO RELATED APPLICATIONS

This application claims priority to PCT Application No. PCT/EP2013/071615, filed on Oct. 16, 2013, which claims priority to German Patent Application No. 10 2012 218 852.5, filed on Oct. 16, 2012.

FIELD OF THE INVENTION

The present invention relates to an electronic control unit and more specifically to electronic control units in a motor vehicle braking system.

BACKGROUND

Particularly as integration of assistance functions that are intended to take the load off the driver when driving a vehicle increases, the complexity of systems in modern motor vehicles mounts. Provision of these functions requires a growing number of components, such as sensors, all of which results in an increased volume of information inside and/or outside the vehicle and in extensive interrelationships. Problems that arise therefrom are those of ensuring fail-safety as the complexity of the systems grows, the increasing system and integration costs, the quality demands to be met, increasing product introduction times and production times per vehicle, for example. These frequently involve the use of modern multicore microcontroller systems that implement a master/slave communication concept. The master entities in this case include CPU systems, direct memory access (DMA) modules and intelligent peripheral modules such as FlexRay, Ethernet and Inter-Processor Link. Ordinary peripheral resources act as slave entities in this case.

EP 1 456 720 B1 describes a multicore redundant control computer system for safety-critical applications that comprises a plurality of computer blocks, wherein each computer block in turn has a multicore redundant control computer system having at least two control computers. The control computers are each equipped with a computation core having semi-redundant or fully redundant peripheral elements and semi-redundant or fully redundant memory elements and are connected to an arbitration unit that monitors the control computers for malfunctions and can couple or decouple them from a vehicle data bus by means of a communication controller that is provided for this purpose.

DE 10 2011 007 467 A1 describes a multicore integrated microprocessor circuit that has a main processor structure and a secondary processor structure, wherein at least the main processor structure is of redundant-core design and executes essentially only safety-critical programs, while the secondary processor structure executes essentially non-safety-critical programs. The main processor structure checks the secondary processor structure for correct operation. In this case, the two processor structures access memory areas that are exclusively associated with each of them, with data interchange being able to take place by means of a shared memory area. In addition, independent and inherently different operating systems are executed on the two processor structures.

The software modules, which are frequently provided by the motor vehicle manufacturers, in particular, or are individualized for said motor vehicle manufacturers, have an increasing need for resources in modern motor vehicle controllers. This makes the integration of software modules that are becoming more extensive increasingly uneconomical, since they need to be merged with the basic software that, by way of example, is provided by a supplier. Customization of all of the software to suit new or extended hardware is correspondingly sophisticated.

SUMMARY

It is an object of the invention to provide a motor vehicle controller for which integration of software modules can be realized effectively and efficiently, particularly when there is a great need for resources for future motor vehicle systems.

The description describes an electronic control unit for controlling and/or regulating at least one motor vehicle system, comprising at least one integrated microcontroller system for executing software, which has at least two microcontroller units that each execute at least one independent operating system, wherein at least one interface is provided for the purpose of interchanging information between the microcontroller units, which electronic control unit is additionally distinguished in that a first microcontroller unit is embodied such that it executes control and/or regulation of a first motor vehicle system, particularly a motor vehicle braking system, and a second microcontroller unit is embodied such that it can use the interface of the first microcontroller unit to provide defaults for the control and/or regulation of the first motor vehicle system.

Within the context of this description, a microcontroller is also understood to mean microprocessors and further integrated circuits of the type in question that have at least one processor and are able to capture and output signals by means of peripheral functions or peripheral interfaces. A controller within the context of the invention may additionally comprise electronic memories, such as registers, mixed-signal circuits and further functional assemblies that are able to be used in an advantageous manner for operating a motor vehicle system.

Basic functions for actuating the first motor vehicle system are therefore carried out by the first microcontroller unit, which means that demands on increased availability in accordance with a prescribed safety level can be met. In addition, the second microcontroller unit can advantageously be used to provide resources that can be used for performing computation-intensive tasks. The performance increase obtained as a result allows the use of future, resource-intensive assistance systems, for example, that are intended to improve the safety of road users.

According to an advantageous embodiment, the first and/or the second microcontroller unit can additionally be used as a basis for specialized hardware, such as individualized circuit portions or electronics for sensors, actuators and/or buses (LIN, FlexRay, CAN).

According to a particularly preferred embodiment, the software implemented on the microcontroller units is encapsulated such that a change to said software can be made on at least one of the microcontroller units without having to make a change to the software on the other microcontroller unit.

Advantageously, encapsulation provided in such a way increases particularly the fail-safety of safety-critical motor vehicle systems, and software modules can be incorporated, or existent software of the microcontroller units can be customized, independently of the other microcontroller unit and software implemented thereon. Furthermore, the modular approach of the hardware and software reduces development time, because development processes become more straightforward, since the separation and encapsulation of the systems and hence also the portability to other hardware are improved.

At least the first operating system and the second operating system are different than one another. The first operating system preferably complies with an operating system standard, particularly OSEK-OS, and the second operating system is preferably based on a standardized software architecture, particularly AUTOSAR.

Advantageously, implementation of software modules for the second operating system is facilitated by a vehicle manufacturer, for example, while safety-oriented software may be provided particularly on the operating system standard that complies with a high safety level.

The second microcontroller unit is embodied such that it executes control and/or regulation of at least one further motor vehicle system.

While the control or regulation of the first motor vehicle system is reserved exclusively for the first microcontroller unit, the second microcontroller unit can thus advantageously be assigned the control or regulation of at least one further motor vehicle system, which is particularly the basis of the fundamental idea according to the invention, the possibility of providing global computation resources.

According to an advantageous embodiment of the invention, the microcontroller system is embodied as a multicore processor, particularly a four-core processor, wherein the microcontroller units are accommodated on a common substrate. Particularly, each microcontroller unit has at least two redundant processors.

This advantageously allows the availability of the microprocessor system to be increased and the demands on corresponding safety levels to be met.

According to a particularly embodiment, the microcontroller system is embodied such that separate memory and/or peripheral resources are associated either with the first microcontroller unit or with the second microcontroller unit or with both microcontroller units. Advantageously, this achieves an improvement in the encapsulation of the microcontroller units.

Particularly preferably the association of the memory and/or peripheral resources is realized by means of a hardware-based protection concept for access operations.

This avoids implementation of an excessively large number or excessively fine granulation of memory protection rules, which likewise has an advantageous effect on the performance of the hardware. Advantageously, fine partitioning of the memory and/or peripheral resources between the master entities or microcontroller units that are existent in the microprocessor system can be realized.

This also provides the opportunity for joint use of individual hardware resources, e.g. register sets, advantageously with a plurality of microcontroller units, rendering multiple implementation of peripheral modules, for the purpose of distinguishing between software components of the various microcontroller units, superfluous.

According to a preferred development of the invention, the hardware-based protection concept is embodied such that each microcontroller unit has at least one associated, in particular static, identifier and the microcontroller system performs authentication for the microcontroller units for the purpose of realizing the access control.

The microcontroller system has at least one electronic memory and/or memory area that comprises memory areas that are respectively associated with the microcontroller units.

Additionally preferably, the interface is a memory area used by the microcontroller units and/or jointly and/or a point-to-point connection.

According to a preferred embodiment of the electronic control unit, it comprises at least one domain controller and is embodied such that a domain controller function of at least one motor vehicle network is provided.

According to an embodiment, the electronic control unit comprises at least one gateway controller and/or is embodied such that a gateway function for communication by different motor vehicle networks is provided.

In addition, the invention comprises the use of at least one embodiment of the electronic control unit described above in a motor vehicle braking system.

Further objects, features and advantages of this invention will become readily apparent to persons skilled in the art after a review of the following description, with reference to the drawings and claims that are appended to and form a part of this specification

BRIEF DESCRIPTION OF THE DRAWINGS

In order to allow brief and simple description of the exemplary embodiments, elements that are the same are provided with the same reference symbols and only the details that are essential to the invention are explained in each case.

For the purpose of describing particularly functional relationships first of all, FIG. 1 shows the microcontroller system 34 of an electronic control unit for actuating at least one motor vehicle system, for example a motor vehicle braking system. In this case, said motor vehicle system comprises a first two-core microcontroller unit 1, the processors thereof being of redundant design.

Figure 1:
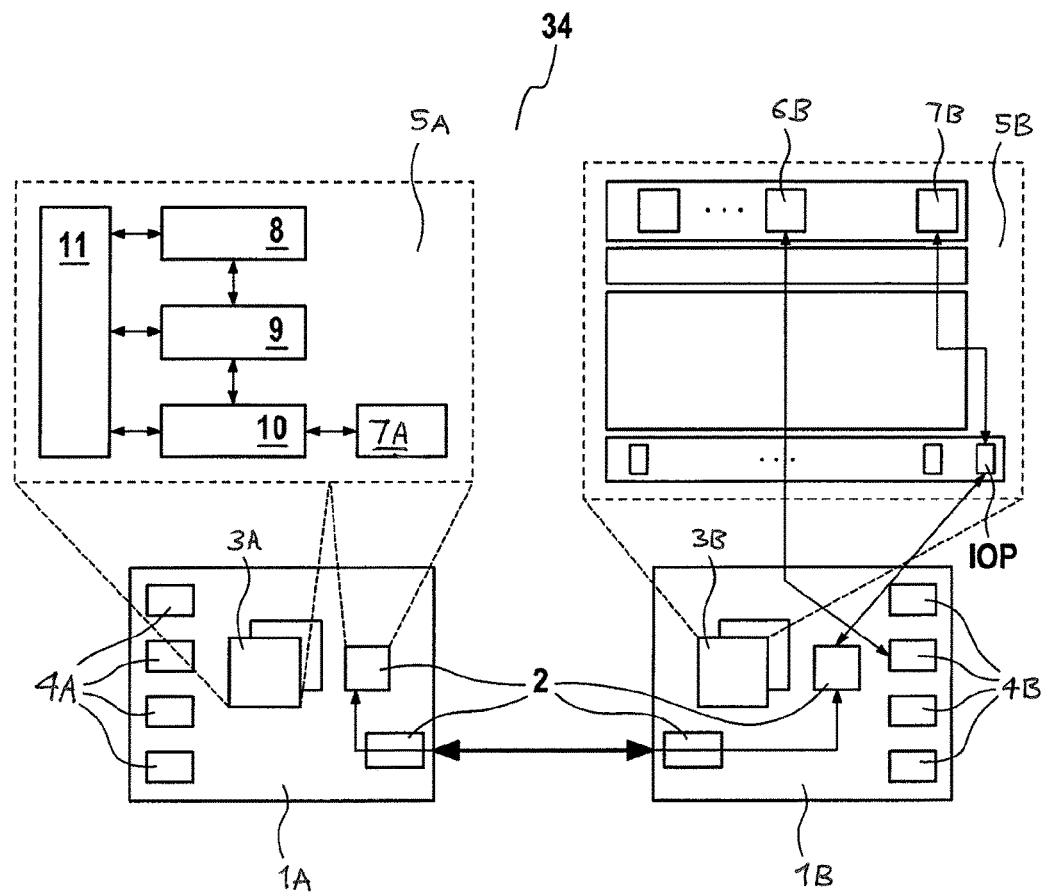
FIG. 1 illustrates a microcontroller system according to an example.

According to the example, the microcontroller unit 1A carries out the actuation of a motor vehicle braking system and comprises the actuation software necessary therefor and interfaces 4A for connecting peripherals (e.g. analog/digital converter, PWM, timer, FlexRay, CAN), the operating system 5A that the microcontroller unit 1A comprises being able to communicate with the relevant peripherals via the interfaces 4A. The operating system 5A complies with a standard for embedded real-time operating systems in the automotive sector, such as the operating system standard OSEK-OS. According to the example, the function abstraction level 8, the system abstraction level 9, the hardware abstraction level 10 and the vehicle integration level 11 are distinguished.

According to this exemplary embodiment, the control unit 30 according to the invention has at least one second multicore microcontroller unit 1B, with an independent second operating system 5B, provided for it that comprises associated interfaces for connecting peripherals 4B. In this case, the second microcontroller unit 1B ostensibly has the task of executing safety-oriented software modules 6B that, by way of example, are provided by vehicle manufacturers. The microcontroller unit 1B provides resources that can be used for performing computation-intensive tasks, e.g. for driving and dynamics functions, while basic software and basic functions of the braking system are carried out by the first microcontroller unit 1. As a result, vehicle manufacturers, in particular, can be provided with resources essentially globally, with support for meeting the demands of the relevant ASIL level (ASIL-D) being provided by core-redundant execution of the microcontroller units 1A, 1B, inter alia. The operating system 5B provided is preferably a standardized software architecture, particularly AUTOSAR, the different software abstraction levels of AUTOSAR being shown schematically in FIG. 1. In this case, the application level comprises the software modules 6B, which can communicate with the relevant peripherals by means of the interfaces 4B.

The MCUs 1, 1B communicate via the interface 2, particularly by means of a point-to-point connection and using the relevant drivers or software 7A, 7B. In this way, the software modules 6B, using defined hardware and software interfaces, can send default values or instructions to the first operating system 5 or microcontroller unit 1A, which then uses them to perform the actual control of the braking system. The communication by the MCUs among one another and with the peripherals is preferably secured by means of check data.

Figure 2:
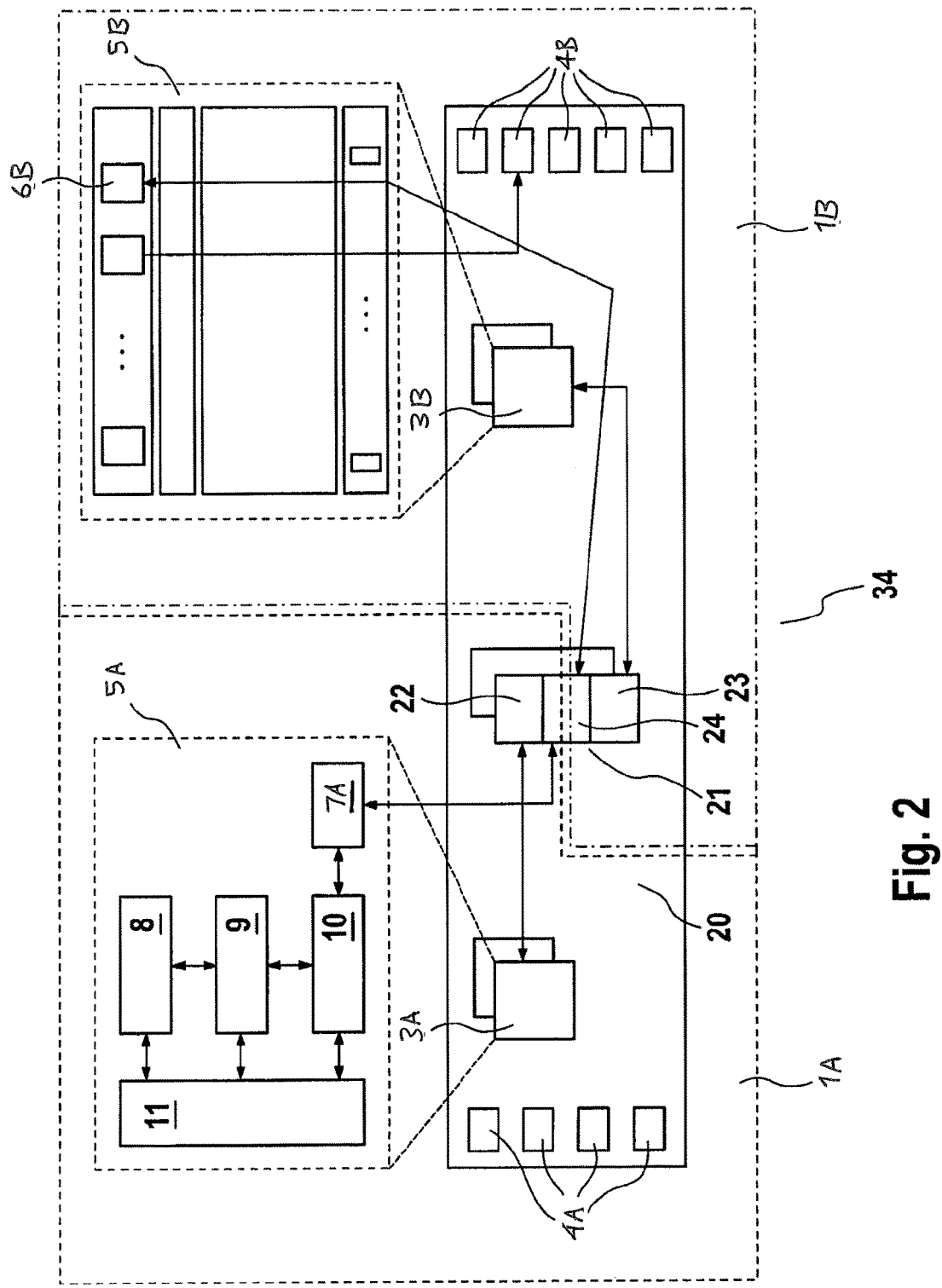
FIG. 2 illustrates a microcontroller system according to an example, comprising a four-core microcontroller.

FIG. 2 shows an exemplary embodiment of the microcontroller system 34 in which said microcontroller system or the microcontroller units 1A, 1B are provided, according to the description relating to FIG. 1, in a common integrated housing having, accordingly, at least four processors 3A, 3B (four-core processor). The components that are essentially already explained have been denoted in FIG. 2 by identical reference symbols to those in FIG. 1.

According to this embodiment, a multiprocessor software concept is realized on a multicore hardware architecture, with at least one electronic memory 21 of redundant design being provided that comprises a first memory area 22, which is disabled for the second operating system 5B, and a second memory area 23, which is associated with the second operating system 5B. The memory area 22 is associated with the first operating system 5A and enabled therefor, while the second memory area 23 is disabled for the first operating system 5. In addition, a jointly used memory area 24 is provided for the first and second operating systems, said memory area realizing the interface 2 described in FIG. 1 that is used for the communication by the operating systems 5A, 5B or microcontroller units 1A, 1B with one another. In this case, the memory areas 22, 23, 24 do not need to be part of a common physical memory, as shown in FIG. 2, but rather may also be realized on separate physical memories. The four-core microcontroller system comprises configuration registers—not shown—in order to ensure separation of the microcontroller units 1A, 1B.

According to a further preferred embodiment, the microcontroller units 1, 1B may also be provided in two separate microcontrollers or microprocessors with separate integrated circuit housings, however.

According to the embodiments described, the processors 3A, 3B of the microcontroller unit 1A, 1B are each of redundant design and preferably operate in a lockstep mode with redundancy monitoring. Depending on the demand on availability or on the safety level that the respective microcontroller unit 1A, 1B needs to comply with, it is also possible to dispense with redundancy, the further processor being able to be provided as an additional computation resource or being dispensed with. The hardware and/or software of the microprocessor system 34 or of the redundant processors 3A, 3B may additionally be designed with diversity.

The software of the microcontroller system 34 is executed on different microcontroller units 1A, 1B and hence on different master entities. In order to ensure freedom from interaction between these separated software components, access operations by the various master entities to memory and peripheral resources are separated. Provided that just complete peripheral modules are partitioned between the microcontroller units 1A, 1B, the separation is made preferably using inherently known methods, such as memory management units (MMU) at core or memory bus level and/or the concept of the trustworthy source at peripheral bus level.

For different embodiments of microprocessor system 34, the microcontroller units 1A, 1B can be allocated peripheral resources, preferably on a variable, e.g. project-specific, basis. This obviates the need for multiple setup of peripheral resources for the microcontroller system 34. The aforementioned approaches are not sufficient for peripheral resources that are jointly used by both microcontroller units 1A, 1B, however, since an excessively large number or excessively fine granulation of memory protection rules would need to be implemented, which would have disadvantageous effects on the performance of the hardware. Therefore, a hardware-based protection concept for access operations to peripheral resources is additionally provided that allows fine partitioning of said peripheral resources between the master entities or microcontroller units 1A, 1B that are existent in the microprocessor system 34.

The relevant hardware component, e.g. peripheral module 4A, 4B or memory 22, 23, 24, is configured statically by means of software, and an identification number associated with every single master is used to authenticate the microcontroller units 1A, 1B. Access operations to peripheral resources are performed only for the microcontroller unit 1A, 1B or master for which this is enabled, otherwise it is disabled. In this case, the separation can be made up to the level of whole registers and/or register sections that are assigned to one of the microcontroller units 1A, 1B. The resultant opportunity for joint use of individual hardware resources with a plurality of microcontroller units 1A, 1B avoids multiple implementation of peripheral modules 4A, 4B, for the purpose of distinguishing between the software components of the various microcontroller units 1, 1B.

Figure 3:
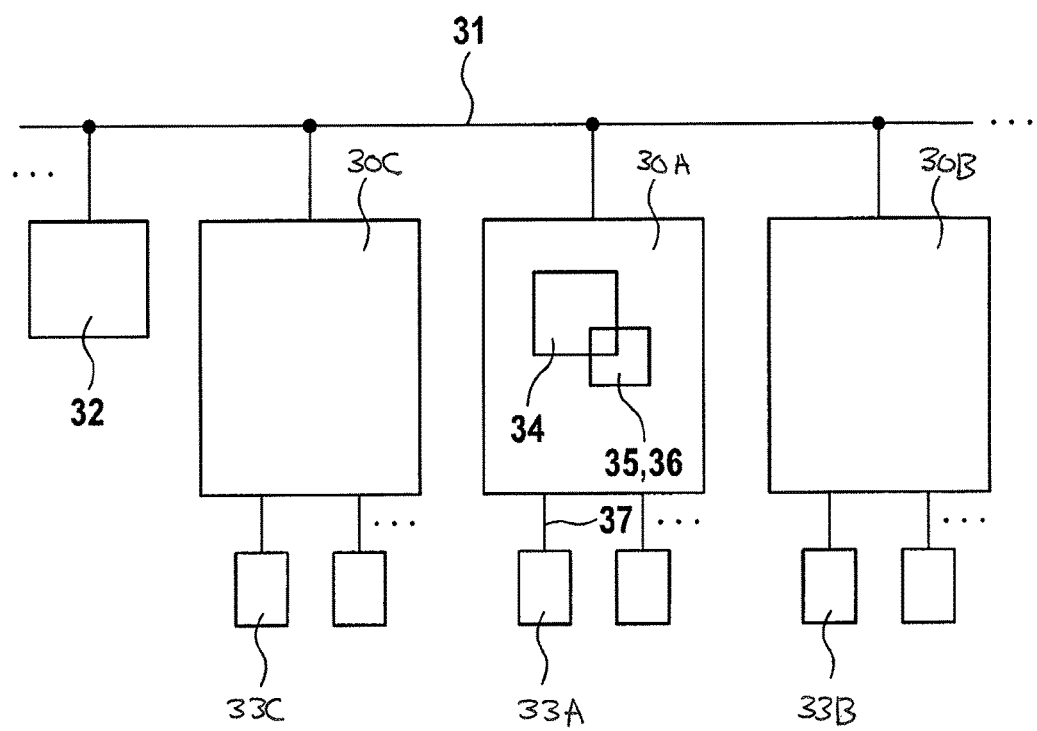
FIG. 3 illustrates an embodiment of the electronic control unit according to the invention in which said electronic control unit is provided as a domain controller for a vehicle network.

FIG. 3 shows an exemplary embodiment of the control unit 30 according to the invention for a brake controller in a motor vehicle braking system. In this case, the control unit 30 comprises the microcontroller system 34 according to the invention. According to a particularly preferred embodiment, the control unit 30 and/or the microcontroller system 34 perform a domain controller function 35 in the networks or bus systems 31, 37 of the motor vehicle. In this case, the domain controller 35 supports gateway functionalities 36, allowing communication by the different bus systems 31 and 37 when there are different underlying types of protocol. Said domain controller has associated actuators, sensors and/or controllers for further systems 33, for example. Sensors, actuators and/or controllers that are directly connected to the network 31 are represented by a block 32. Further domain controllers and associated components are represented by blocks 30B, 33C, 33B, and 33C.

The invention claimed is:

1. An electronic control unit for controlling and/or regulating at least one motor vehicle system, comprising:

at least one integrated microcontroller system for executing software, which has at least two microcontroller units that each execute at least one independent operating system, at least one interface configured to interchange information between the microcontroller units, a first microcontroller unit, the first microcontroller unit configured to execute a first independent operating system and control and/or regulation of a first motor vehicle system, wherein the first motor vehicle system is a motor vehicle braking system, a second microcontroller unit, the second microcontroller unit being configured to execute a second independent operating system and use the interface of the first microcontroller unit to provide defaults for the control and/or regulation of the first motor vehicle system, wherein the at least one integrated microcontroller system, at least one interface and the first and second microcontroller units are disposed in a common housing, and wherein the first independent operating system and the second independent operating system are different than one another.

2. The electronic control unit as claimed in claim 1, wherein the software implemented on the microcontroller units is configured such that a change to said software can be made on at least one of the microcontroller units without having to make a change to the software on the other microcontroller unit.

3. The electronic control unit as claimed in claim 1, wherein the second microcontroller unit is configured to control and/or regulate of at least one further motor vehicle system.

4. The electronic control unit as claimed in claim 1, wherein the microcontroller system is a multicore processor, wherein the microcontroller units are accommodated on a common substrate.

5. The electronic control unit as claimed in claim 1, wherein each microcontroller unit has at least two redundant processors.

6. The electronic control unit as claimed in claim 1, wherein the microcontroller system is configured such that separate memory and/or peripheral resources are associated either with the first microcontroller unit or with the second microcontroller unit or with both microcontroller units.

7. The electronic control unit as claimed in claim 1, wherein the association of the memory and/or peripheral resources with the microcontroller units is realized by means of a hardware-based protection concept for access control.

8. The electronic control unit as claimed in claim 7, wherein hardware-based protection concept is configured such that each microcontroller unit has at least one associated identifier and the microcontroller system performs authentication for the microcontroller units for realizing the access control.

9. The electronic control unit as claimed in claim 1, wherein the microcontroller system has at least one electronic memory and/or memory area that comprises memory areas that are respectively associated with the microcontroller units.

10. The electronic control unit as claimed in claim 1, wherein the interface is a memory area used by the microcontroller units jointly and/or a point-to-point connection.

11. The electronic control unit as claimed in claim 1, wherein a first operating system complies with an operating system standard and a second operating system is based on a standardized software architecture.

12. The electronic control unit as claimed in claim 1, wherein the electronic control unit and/or the microprocessor system comprise(s) at least one domain controller and/or is/are embodied such that a domain controller function of at least one motor vehicle network is provided.

13. The electronic control unit as claimed claim 1, wherein the electronic control unit and/or the microprocessor system comprise(s) at least one gateway controller and/or is/are embodied such that a gateway function for communication by different motor vehicle networks is provided.

14. The electronic control unit as claimed in claim 1, wherein the electronic control unit is in communication with the motor vehicle braking system.

* * * * *